United States Patent
Li

(10) Patent No.: US 10,087,336 B2
(45) Date of Patent: Oct. 2, 2018

(54) AQUEOUS INK-JET INKS CONTAINING AMPHOTERIC POLYURETHANE AS BINDER

(71) Applicant: E I DU PONT DE NEMOURS AND COMPANY, Wilmington, DE (US)

(72) Inventor: Xiaoqing Li, Newark, NJ (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/327,723

(22) PCT Filed: Jul. 28, 2015

(86) PCT No.: PCT/US2015/042396
§ 371 (c)(1),
(2) Date: Jan. 20, 2017

(87) PCT Pub. No.: WO2016/018876
PCT Pub. Date: Feb. 4, 2016

(65) Prior Publication Data
US 2017/0210920 A1     Jul. 27, 2017

Related U.S. Application Data

(60) Provisional application No. 62/031,298, filed on Jul. 31, 2014.

(51) Int. Cl.
*C09D 11/033* (2014.01)
*C09D 11/102* (2014.01)
*C09D 11/322* (2014.01)

(52) U.S. Cl.
CPC .......... *C09D 11/102* (2013.01); *C09D 11/033* (2013.01); *C09D 11/322* (2013.01)

(58) Field of Classification Search
CPC .................................................. C09D 11/102

USPC .................................................. 523/160, 161
See application file for complete search history.

(56) References Cited

U.S. PATENT DOCUMENTS

| | | |
|---|---|---|
| 3,412,054 A | 11/1968 | Milligan et al. |
| 4,269,748 A | 5/1981 | Nachtkamp et al. |
| 4,829,122 A | 5/1989 | Pedain et al. |
| 5,085,698 A | 2/1992 | Ma et al. |
| 5,272,201 A | 12/1993 | Ma et al. |
| 5,554,739 A | 9/1996 | Belmont |
| 6,852,156 B2 | 2/2005 | Yeh et al. |
| 2003/0128246 A1 | 9/2003 | Redding et al. |
| 2005/0182154 A1 | 8/2005 | Berge et al. |
| 2005/0215663 A1 | 9/2005 | Berge et al. |
| 2012/0214939 A1 | 8/2012 | Li et al. |
| 2013/0123426 A1* | 5/2013 | Clarke ................. C09D 11/326 524/871 |

FOREIGN PATENT DOCUMENTS

| | | |
|---|---|---|
| JP | 2001002965 A | 1/2001 |
| WO | 2010068871 A1 | 6/2010 |
| WO | 2011/074167 A1 | 6/2011 |

OTHER PUBLICATIONS

Society of Dyers and Colourists, Bradford, Yorkshire, UK and published in the Color Index, Third Edition, 1971.
International Search Report and Written Opinion dated Oct. 8, 2015 for International Patent Application No. PCT/US2015/042396.

* cited by examiner

*Primary Examiner* — Terressa Boykin
(74) *Attorney, Agent, or Firm* — Simon L. Xu

(57) ABSTRACT

The present disclosure provides aqueous ink-jet inks having improved stability containing an aqueous vehicle, a colorant, and an amphoteric polyurethane as a binder. The amphoteric polyurethane contains a plurality of tertiary amine groups derived from an amine-containing monomer, and a plurality of anionic acid groups.

13 Claims, No Drawings

AQUEOUS INK-JET INKS CONTAINING AMPHOTERIC POLYURETHANE AS BINDER

CROSS REFERENCE TO RELATED APPLICATIONS

This application claims priority under 35 U.S.C. § 119 from U.S. Provisional Application Ser. No. 62/031,298, filed Jul. 31, 2014, which is incorporated by reference in its entirety.

BACKGROUND OF THE DISCLOSURE

This disclosure relates to novel aqueous ink-jet inks having improved stability containing an aqueous vehicle, a colorant, and an amphoteric polyurethane as a binder.

Ink-jet printing is a non-impact printing process in which droplets of ink are deposited on a substrate, such as paper, to form the desired image. During ink-jet printing, it is often necessary for the recently printed-article to come into contact with the paper-handling mechanism of the printer, e.g., in the case of duplex printing where both sides of the media are printed. In this situation the first printed side may not yet be completely dry and as a result the print surface can be damaged and the ink can transfer onto the paper-handling mechanism and then onto subsequent prints. This problem is particularly acute when using a wet-press which involves considerable paper-handling at high speeds. Often the press uses heated rollers to transfer media which is prone to having problems as the drying ink sticks to the rollers. Severe problems may be encountered when slow-drying inks are printed onto non-absorbent media such as coated offset media.

Polyurethane dispersion particles are often formulated into ink-jet inks to provide fast drying, improve image durability and/or image quality such as inter-color bleed and image uniformity. The physical properties such as viscosity and pH of ink-jet inks containing anionic polyurethane particles tend to change upon storage over time especially after oven aging at elevated temperatures. A need exists for highly stable ink-jet inks that can be printed on various substrates to form durable, high quality image. The present disclosure satisfies this need by providing ink compositions containing an amphoteric polyurethane dispersion where the amphoteric polyurethane contains a plurality of tertiary amine groups derived from an amine-containing monomer and a plurality of anionic acid groups.

SUMMARY OF THE DISCLOSURE

An embodiment of the present disclosure provides an ink-jet ink comprising an aqueous vehicle, a colorant, and a self-stabilized amphoteric polyurethane as a binder, wherein said amphoteric polyurethane contains a plurality of tertiary amine groups derived from an amine-containing monomer, and a plurality of anionic acid groups, said colorant is selected from the group consisting of a self-dispersing pigment, a pigment dispersed by a polymeric dispersant, a dispersed dye, and a dye, and wherein said amphoteric polyurethane is not a dispersant.

Another embodiment provides that the colorant is a pigment dispersed by a polymeric dispersant.

Another embodiment provides that the ink is neutralized by alkaline to having a pH of greater than about 7.

Another embodiment provides that the ink has a viscosity drift of less than 20% after oven aging at 70° C. for 14 days.

Another embodiment provides that the anionic acid groups are carboxylic groups with an acid number in the range of 10 through 90.

Another embodiment provides that the binder is cross-linked.

Another embodiment provides that the % THF insoluble of said crosslinked binder is equal or greater than 30%.

Yet another embodiment provides that the colorant is a self-dispersing pigment.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants. The polyurethane dispersants described herein are in fact dispersions themselves.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the term "ionizable groups," means potentially ionic groups.

As used herein, the term "substantially" means being of considerable degree, almost all.

As used herein, the term "MW" means weight average molecular weight.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term "NCO" means isocyanate.

As used herein, the term "cPs" means centipoise, a viscosity unit.

As used herein, the term "mN·m$^{-1}$" means milliNewtons per meter, a surface tension unit.

As used herein, the term "mPa·s" means millipascal second, a viscosity unit.

As used herein, the term "psig" means pounds square inch gauge, a pressure unit that does not include air pressure.

As used herein, the term "prepolymer" means the polymer that is an intermediate in a polymerization process, and can be considered a polymer.

As used herein, the term "AN" means acid number, mg KOH/gram of solid polymer.

As used herein, the term "PUD" means the polyurethanes dispersions described herein.

As used herein, the term "DTG" means direct to garment.

As used herein, the term "BMEA" means bis(methoxyethyl)amine.

As used herein, the term "DBTDL" means dibutyltin dilaurate.

As used herein, the term "DMPA" means dimethylol propionic acid.

As used herein, the term "IPDI" means isophorone diisocyanate.

As used herein, the term "NMP" means n-Methyl pyrolidone.

As used herein, the term "TEB" means triethylene glycol monobutyl ether, a reagent supplied by Dow Chemical.

As used herein, the term "Sulfolane" means tetramethylene sulfone.

As used herein, Terathane® 650 is a polyether diol from Invista, Wichita, Kans.

As used herein, the term "EDA" means ethylene diamine.

As used herein, the term "TEA" means triethylamine.

As used herein, the term "DEA" means diethanol amine.

As used herein, the term "DMPA" means dimethylol propionic acid.

As used herein, the term "MDEA" means methyl diethanol amine.

As used herein, the term "TETA" means triethylenetetramine.

As used herein, the term "THF" means tetrahydrofuran.

As used herein, the term "TLB-2" means Dainichiseika® TRB-2, a cyan pigment.

As used herein, the term "Y74" means Yellow 74, a yellow pigment supplied by Sun Chemical.

As used herein, Denacol® 321 is trimethylolpropane polyglycidyl ether, a cross-linking reagent from Nagase Chemicals Ltd., Osaka, Japan.

As used herein, Desmophen® C1200 is a polyester carbonate diol from Bayer (Pittsburgh, Pa.).

As used herein, Surfynol® 440 is a nonionic surfactant from Air Products (Allentown, Pa.).

As used herein, Terathane® 1000 is a polytetramethylene oxide polyol from Invista (Wichita, Kans.).

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

Colorants

A wide variety of organic and inorganic pigments, alone or in combination, may be dispersed with a polymeric dispersant to prepare an ink, especially an ink-jet ink. The term "pigment" as used herein means an insoluble colorant that requires to be dispersed with a dispersant and processed under dispersive conditions in the presence of a dispersant. The colorant also includes dispersed dyes. The dispersion process results in a stable dispersed pigment. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media, and the resulting pigments are obtained as a water-wet presscake. In presscake form, the pigment does not agglomerate to the extent like it is in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in ink-jet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

The pigment of the present disclosure can also be a self-dispersing (or self-dispersible) pigment. The term self-dispersing pigment (or "SDP") refers to pigment particles whose surface has been chemically modified with hydrophilic, dispersability-imparting groups that allow the pigment to be stably dispersed in an aqueous vehicle without a separate dispersant. "Stably dispersed" means that the pigment is finely divided, uniformly distributed and resistant to particle growth and flocculation.

The SDPs may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. Nos. 5,554,739 and 6,852,156.

The SDPs may be black, such as those based on carbon black, or may be colored pigments. Examples of pigments with coloristic properties useful in ink-jet inks include: Pigment Blue 15:3 and Pigment Blue 15:4 (for cyan); Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP. Colorants are referred to herein by their "C.I." designations established by Society Dyers and Colourists, Bradford, Yorkshire, UK and published in *The Color Index*, Third Edition, 1971.

The SDPs of the present disclosure may have a degree of functionalization wherein the density of anionic groups is less than about 3.5 µmoles per square meter of pigment surface (3.5 $\mu mol/m^2$), and more specifically, less than about 3.0 $\mu mol/m^2$. Degrees of functionalization of less than about 1.8 $\mu mol/m^2$, and more specifically, less than about 1.5 $\mu mol/m^2$, are also suitable and may be preferred for certain specific types of SDPs.

The range of useful particle size after dispersion is typically from about 0.005 um to about 15 um. Typically, the pigment particle size should range from about 0.005 um to about 5 um; and, specifically, from about 0.005 um to about 1 um. The average particle size as measured by dynamic light scattering is less than about 500 nm, typically less than about 300 nm.

The amount of pigment present in the ink is typically in the range of from about 0.1% to about 25% by weight, and more typically in the range of from about 0.5% to about 10% by weight, based on the total weight of ink. If an inorganic pigment is selected, the ink will tend to contain higher percentages by weight of pigment than with comparable inks employing organic pigment, since inorganic pigments generally have higher densities than organic pigments.

Polymeric Dispersant

A typical polymeric dispersant is a polyurethane polymer. Polyurethane polymers are, for the purposes of the present disclosure, polymers wherein the polymer backbone contains urethane linkage derived from the reaction of an isocyanate group (from, e.g., a di- or higher-functional monomeric, oligomeric or polymeric polyisocyanate) with a hydroxyl group (from, e.g., a di- or higher-functional monomeric, oligomeric or polymeric polyol). Such polymers may, in addition to the urethane linkage, also contain other isocyanate-derived linkages such as urea, as well as other types of linkages present in the polyisocyanate components or polyol components (such as, for example, ester and ether linkage).

The polyurethane dispersant can further be cross-linked after absorbing onto a pigment as disclosed in U.S. Patent Application Publication No. 2012/0214939, which is incorporated by reference herein for all purposes as if fully set forth.

Binder

A binder is a polymeric compound or a mixture of polymeric compounds that is added to the ink formulation. The binder can impart properties to the final printed material that, for example, gives greater durability to the printed material. Typical polymers used as binders in ink-jet inks include polyurethane dispersions and polyurethane solutions, acrylics, styrene acrylics, styrene butadienes, styrene butadiene acrylonitriles, neoprenes, ethylene acrylic acids, ethylene vinyl acetate emulsions, latexes and the like. The binder may be a solution or stabilized as an emulsion by having ionic substituents such as carboxylic acids, sulfur containing acids, amine groups, and other similar ionic groups, and/or non-ionic hydrophilic substituents such as —$(CH_2CH_2O)_n$—, where n is an integer from 1 to 20. In the present disclosure, amphoteric polyurethanes containing a plurality of tertiary amine groups derived from an amine-containing monomer, and a plurality of anionic acid groups were found to be superior binder for ink-jet ink when compared to acrylic and anionic polyurethane binders. These amphoteric polyurethanes can be synthesized by using monomers such as diols or triols incorporating tertiary amine groups. The ratio of the number of monomers with anionic groups to the number of monomer with tertiary amine groups is preferably greater than 1 to ensure compatibility with anionic pigment dispersion. The amount of the amphoteric polymer typically ranges from about 0.05% to about 20% by weight, based on the total weight of the ink. More typically, the amount of the amphoteric polymer ranges from about 1% to about 12% by weight, based on the total weight of the ink.

Amphoteric Polyurethanes

Amphoteric polyurethane is typically prepared by a multiple step process. During the first stage of prepolymer formation, a diisocyanate is reacted with isocyanate (NCO) reactive compounds having tertiary amine groups, isocyanate reactive compounds having anionic salt forming groups, and optionally, isocyanate reactive compounds with no chargeable groups. Typically, the prepolymer is an NCO-terminated material that is achieved by using a molar excess of NCO. This intermediate polymer or prepolymer from the first stage polymerization is then added to water, or water is added to the prepolymer, to form a polymer dispersed in water (aqueous dispersion) that can subsequently undergoes chain extension reactions in the aqueous phase. In the chain extension stage, the polyurethane is formed by chain extending the pre-polymer with polyamine chain extenders, which can optionally be partially or wholly blocked as disclosed in U.S. Pat. No. 4,269,748 and U.S. Pat. No. 4,829,122 (the disclosures of which are incorporated by reference herein for all purposes as if fully set forth). The polyamines include 1-amino-3-aminomethyl-3,5,5-trimethylcyclohexane (isophorone diamine or IPDA), bis-(4-amino-cyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine. In some cases, chain termination may be desirable. This requires the addition, in most cases, of a mono-NCO reactive material such as a mono-amine or mono-alcohol. The amines or alcohols are generally aromatic, aliphatic or alicyclic and contain between 1 to 30, preferably 2 to 15 and more preferably 2 to 10 carbon atoms. These may contain additional substituents provided that they are not as reactive with isocyanate groups as the amine or alcohol groups.

Chain terminators and chain extenders can be used together, either as mixtures or as sequential additions to the NCO-prepolymer.

Suitable diisocyanates are those that contain either aromatic, cycloaliphatic or aliphatic groups bound to the isocyanate groups. Mixtures of these compounds may also be used. Examples of suitable diisocyanates include cyclohexane-1,3- and -1,4-diisocyanate; 1-isocyanato-3-isocyanatomethyl-3,5,5-trimethyl-cyclohexane (isophorone diisocyanate or IPDI); bis-(4-isocyanatocyclohexyl)-methane; 1,3- and 1,4-bis-(isocyanatomethyl)-cyclohexane; 1-isocyanato-2-isocyanatomethyl cyclopentane; 2,4'-diisocyanato-dicyclohexyl methane; bis-(4-isocyanato-3-methyl-cyclohexyl)-methane, alpha,alpha,alpha',alpha'-tetramethyl-1,3- and/or -1,4-xylylene diisocyanate; 1-isocyanato-1-methyl-4 (3)-isocyanatomethyl cyclohexane; and 2,4- and/or 2,6-hexahydrotoluylene diisocyanate.

Additional diisocyanates may be linear or branched and contain 4 to 12 carbon atoms, preferably 4 to 9 carbon which include 1,4-tetramethylene diisocyanate; 1,6-hexamethylene diisocyanate; 2,2,4-trimethyl-1,6-hexamethylene diisocyanate; and 1,12-dodecamethylene diisocyanate. 1,6-hexamethylene diisocyanate and isophorone diisocyanate are examples of diisocyanates effective for the crosslinked polyurethanes Examples of isocyanate reactive compound (monomer) having tertiary amino groups are preferably selected from N-methyl diethanolamine, N-ethyl diethanolamine, N-butyl diethanolamine, N-methyl dipropanolamine or triethanolamine, more preferably from N-methyl diethanolamine or N-tertiary butyl diethanolamine or mixtures thereof.

Isocyanate reactive compounds having anionic groups (monomer) include, for example, isocyanate reactive compounds with carboxylic acid groups, sulphonic acid groups, and phosphoric acid groups, Examples of carboxylic group-containing compounds are the hydroxy-carboxylic acids corresponding to the formula (HO)xQ(COOH)y wherein Q represents a straight or branched, hydrocarbon radical containing 1 to 12 carbon atoms, x is 1 or 2 (preferably 2), and y is 1 to 3 (preferably 1 or 2).

Examples of these hydroxy-carboxylic acids include citric acid, tartaric acid and hydroxypivalic acid.

Especially preferred acids are those of the above-mentioned formula wherein x is 2 and y is 1. These dihydroxy alkanoic acids are described in U.S. Pat. No. 3,412,054, the disclosure of which is incorporated by reference herein for all purposes as if fully set forth. Especially preferred dihydroxy alkanoic acids are the α,α-dimethylol alkanoic acids represented by the structural formula:

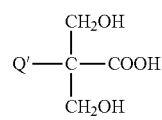

wherein Q' is hydrogen or $C_1$-$C_8$ alkyl. The most preferred compound is α,α-dimethylol propionic acid, i.e., wherein Q' is methyl in the above formula.

Examples of isocyanate reactive compounds with no chargeable groups include hydrophilic compound with di-OH groups (hydrophilic polyol) and hydrophobic compound with di-OH groups (hydrophobic polyol). Hydrophilic polyol is polyol having non-ionic dispersing groups include, for example, an alkylene oxide or polyoxyalkylene oxide segment, e.g., —$((CH_2)_nO)_m$—, wherein n can preferably be from 2 to 4, and m can be from about 1 to 400, preferably from about 5 to 200. Suitable hydrophobic polyols are those having a molecular weight of about 60 to about 6000. Of these, the polymeric polyols are best defined by the number average molecular weight, and can range from about 200 to about 6000, preferably about 800 to about 3000, and more preferably about 1000 to about 2500. The molecular weights are determined by hydroxyl group analysis (OH number). Examples of these polymeric polyols include polyols of polyester, polyether, polycarbonates, polyacetals, poly (meth)acrylates, polyester amides, polythioethers or mixed polymers such as a polyester-polycarbonate where both ester and carbonate linkages are found in the same polymer. A combination of these polymers can also be used. Similar NCO reactive materials can be used as described for hydroxy containing compounds and polymers, but which contain other NCO reactive groups. Examples would be dithiols, diamines, thioamines and even hydroxythiols and hydroxylamines. These can either be compounds or polymers with the molecular weights or number average molecular weights as described for the polyols.

In addition to the above-mentioned components, which are preferably difunctional in the isocyanate polyaddition reaction, mono-functional and even small portions of trifunctional and higher functional components generally known in polyurethane chemistry, such as trimethylolpropane or 4-isocyanantomethyl-1,8-octamethylene diisocyanate, may be used in cases in which branching of the NCO prepolymer or polyurethane is desired. However, the NCO prepolymers should be substantially linear and this may be achieved by maintaining the average functionality of the prepolymer starting components at or below 2:1.

In order to enable the formation of self-dispersible polyurethane dispersion, the neutralizing agent for anionic acid groups is added. Examples of neutralizing agents for converting the acid groups to anionic salt groups include alkali metal cations, trialkyl-substituted tertiary amines, such as triethyl amine, tripropyl amine, dimethylcyclohexyl amine, dimethylethyl amine, and 4-methylmorpholine-oxide, substituted amines such as diethyl ethanol amine, diethanol methyl amine.tertiary amines. The conversion may take place after polymer synthesis or before the polymer synthesis at the monomer stage. The mole ratio of neutralizing agent to anionic acid groups preferably ranges from 0.5 to 1, more preferably at least 0.6. Neutralizing agent or quaternizing agent to enable formation of cationic salt from tertiary amine groups can be optionally added. Examples of amine neutralizing agent include inorganic acids such as hydrochloric acid, sulfuric acid and phosphoric acid; and organic acids such as acetic acid, propionic acid, lactic acid, succinic acid, glycolic acid, gluconic acid and glyceric acid. Examples of quaternizing agent examples include alkyl halides such as 2-bromopropane, 2-bromobutane 2-iodobutane; benzyl halides such as benzyl chloride and benzyl bromide; and dialkyl sulfates such as dimethyl sulfate and diethyl sulfate. The conversion may also take place after polymer synthesis or before the polymer synthesis at the monomer stage. The mole ratio of neutralizing or quaterizing agent to tertiary amine groups ranges from 0 to 0.8, more preferably from 0 to 0.5.

A stable aqueous dispersion of amphoteric polyurethane suitable for use as a binder additive has a dry polymer content of up to about 60% by weight, typically from about 15 to about 60 ?% by weight, and more typically from about 30 to about 40% by weight, based on the total dispersion weight. However, it is always possible to dilute the dispersions to a concentration with any minimum solids content desired.

Cross-Linked Amphoteric Polyurethane Binder

A cross-linked polyurethane refers to a polyurethane having branched and 3-dimensional structure with limited solubility in THF and acetone. The degree of crosslinking is measured by THF % insoluble as described below. Suitable cross-linked amphoteric polyurethanes are typically prepared by multi-step synthetic processes as described above. Cross-linking can take place at any stage during prepolymer synthesis, water addition and chain extension. Typically, cross-linking of the polyurethane binder is completed prior to its addition to an ink formulation.

The means to achieve cross-linking of the polyurethane generally rely on at least one component of the polyurethane (starting material and/or intermediate) having three or more functional reaction sites. Reaction of these reaction sites produces a cross-linked polyurethane. When only two reactive sites are available on each reactive components, only linear (albeit possibly high molecular weight) polyurethanes are produced. Examples of cross-linking techniques include, but are not limited to, the following:
  (a) the isocyanate-reactive moiety has at least three reactive groups, such as polyfunctional amines or polyol;
  (b) the isocyanate has at least three isocyanate groups;
  (c) the prepolymer chain has at least three reactive sites that can react via reactions other than the isocyanate reaction, for example with amino trialkoxysilanes;
  (d) synthesis of a polyurethane with carbonyl functionality, followed by addition of a dihydrazide compound; and
  (e) any combination of the above cross-linking methods (a) through (f) and other cross-linking means known to those of ordinary skill in the relevant art.

The amount of cross-linking of the polyurethane to achieve the desired properties can vary over a broad range. While not being bound to theory, the amount of cross-linking is a function of the polyurethane composition, the whole sequence of reaction conditions utilized to form the polyurethane and other factors known to those of ordinary skill in the art.

Based on techniques described herein, a person having ordinary skill in the art is able to determine, via routine experimentation, the cross-linking needed for a particularly type of polyurethane to obtain an effective ink-jet ink.

The amount of cross-linking can be measured by a Tetrahydrofuran (THF) Insolubles test. To obtain % THF Insolubles of a polyurethane, about 1 gram of the dried polyurethane film prepared by drying the polyurethane dispersion at 150° C. for 1 hour, is mixed with 100 grams of THF for 1 hour. The mixture is then filtered through a 10 micron glass fiber filter. The undissolved solid is then weighed after the solid is dried for 1 hour in a 100° C. oven. The % THF insolubles of the polyurethane is calculated using the equation below:

$$\% \ THF \ \text{Insolubles} = \frac{\text{Weight of undissolved polyurethane}}{\text{Weight of polyurethane film before disolution in } THF} * 100$$

The higher the % THF Insolubles of a polyurethane, the higher the degree of cross-linking of the polyurethane.

The upper limit of cross-linking of a polyurethane is related to the ability of the polyurethane to form a stable aqueous dispersion. As long as a cross-linked polyurethane has adequate ionic functionality to make it stable when inverted into water, the corresponding level of cross-linking is deemed acceptable and will lead to an improved ink-jet ink. The emulsion/dispersion stability of the cross-linked polyurethane can also be improved by adding dispersants or emulsifiers. The upper limit of cross-linking as measured by the THF Insolubles test is about 97%.

The lower limit of cross-linking of a polyurethane is about 10% or greater, typically about 20% or greater, and more typically about 30% or greater, as measured by the THF Insolubles test.

Further details about cross-linking of polyurethane binders and their use in aqueous ink-jet inks can be found in U.S. Patent Application Publication No. 20050182154.

Ink Vehicle

The ink of the present disclosure comprises an ink vehicle, typically an aqueous ink vehicle, also known as aqueous vehicle or aqueous carrier medium.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g., Surfynol® series commercially available from Air Products), ethoxylated alkyl primary alcohols (e.g., Neodol® series commercially available from Shell) and secondary alcohols (e.g., Tergitol® series commercially available from Union Carbide), sulfosuccinates (e.g., Aerosol® series commercially available from Cytec), organosilicones (e.g., Silwet® series commercially available from Witco) and fluoro surfactants (e.g., Zonyl® series commercially available from DuPont).

The amount of glycol ether(s) and 1,2-alkanediol(s) added is typically in the range of from 1% to 15%, and more typically from 2% to 10%/o by weight, based on the total weight of the ink. Surfactants may be used, typically in the amount of from 0.01% to 5% and more typically from 0.2% to 2%, by weight based on the total weight of the ink.

Although not restricted to any particular viscosity range or printhead, the inks of the disclosure are particularly suited to lower viscosity applications. Thus the viscosity (at 25° C.) of the inks of this disclosure may be less than about 15 mPa·s, or less than about 12 mPa·s, and even more advantageously, less than about 10 mPa·s.

Other Ingredients

Other ingredients, additives, may be formulated into the ink-jet ink, to the extent that such other ingredients do not interfere with the stability and jettability of the ink-jet ink. This may be readily determined by routine experimentation by one skilled in the art.

Surfactants are commonly added to inks to adjust surface tension and wetting properties. Suitable surfactants include the ones disclosed in the Vehicle section above. For example, anionic, non-ionic, cationic or amphoteric surfactants may be used. Surfactants are typically used in amounts up to about 5% and more typically in amounts up to 3% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenyl)acetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

The pH of an ink is typically greater than 7, and can be adjusted by bases including amines, alkalines or alkali hydroxides, and other commonly used pH adjusting agents. One skill in the art can readily select a suitable pH adjusting agent that is compatible with other ingredients in an ink.

Co-solvents, such as those exemplified in U.S. Pat. No. 5,272,201 (incorporated by reference herein for all purposes as if fully set forth) may be included to improve pluggage inhibition properties of the ink composition.

Certain reagents can be used as additives to an ink-jet ink to effect post printing curing. Post printing curing is often facilitated by heating of the sample after it is printed. Example of suitable post printing curing agents include amide and amine-formaldehyde resin, phenolic resins, urea resins and blocked polyisocyanate. The selected post printing curing agent should be soluble or dispersible in an ink. Inks containing selected post printing curing agents are stable in storage, which means no curing reaction took place before printing. Only after the ink is printed and when the printed image is fused with heat and optionally pressure, that the post printing curing agent undergoes chemical reaction with the binder, dispersant, ink vehicle, substrate, etc. A specific example of post printing curing agent is Cymel® 303 ULF, from Cytec, West Patterson, N.J.

Biocides may be used to inhibit growth of microorganisms.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Ink Sets

The term "ink set" refers to all the individual inks or other fluids an ink-jet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The black, magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. These "gamut-expanding" inks are particularly useful in textile printing for simulating the color gamut of analog screen printing, such as disclosed in U.S. Patent Application Publication No. 20030128246.

Substrate

The present embodiments are particularly advantageous for ink-jet printing on bond paper, fabrics, and nonporous media such as vinyl packaging.

Another particularly advantageous use of the inks and ink sets of the present disclosure is in the ink-jet printing of commercial coated offset media. Commercial offset paper typically contains a nonporous smooth surface. The smooth non-porous surface is formed by a coating which requires more time for fluids to penetrate. In many instances, offset coatings contain polymers that are more hydrophobic, e.g., styrene-butadiene based, than paper coatings specifically designed for ink-jet ink, e.g., water-soluble polymers such as polyvinyl alcohol. Thus, because offset coatings are typically hydrophobic, have poor penetration properties, and are smooth/non-porous, offset coatings tend to interact poorly with water-based inks. Examples of polymers used to coat offset media include latex binders, polystyrenes, polyolefins (polypropylene, polyethylene, polybutadiene), polyesters (PET), polyacrylates, polymethacrylates, and/or poly (maleic anhydride).

The following examples illustrate the present disclosure without, however, being limited thereto.

EXAMPLES

Solid Content Measurement

Solid content for the solvent free polyurethane dispersions was measured with a moisture analyzer, Model MA50 from Sartorius. For polyurethane dispersions containing a high boiling solvent, such as NMP, tetraethylene glycol dimethyl ether, or sulfolane, the solid content was determined by the weight difference before and after baking in an oven set at 150° C. oven for 180 minutes.

Viscosity Drift

The term "viscosity drift" as used herein means the percentage change in viscosity over time. The value of viscosity drift is an indicator of ink stability. Inks of the present disclosure were subjected to aging tests at 70° C. for durations of 1 week and 2 weeks. The viscosity drift of an ink is calculated using the equation below:

$$\text{Viscosity Drift} = \frac{\text{Final Ink Viscosity} - \text{Initial Ink Viscosity}}{\text{Initial Ink Viscosity}} * 100$$

The higher the absolute value of the viscosity drift, the less stable the ink.

Polymeric Dispersant

To a dry, alkali- and acid-free flask equipped with an additional funnel, a condenser and a stirrer, under a nitrogen atmosphere was added Terathane® T-650 (300 g), DMPA (180 g), Sulfolane (876.5 g) and DBTL (0.12 g). The resulting mixture was heated to 60° C. and thoroughly mixed. To this mixture was added IPDI (437.5 g) via the additional funnel mounted on the flask followed by rinsing any residual IPDI in the additional funnel into the flask with Sulfolane (15 g). The temperature for the reaction mixture was raised to 85° C. and maintained at 85° C. until the isocyanate content reached 0.8% or below. The temperature was then cooled to 60° C. and maintained at 60° C. while BMEA (46 g) was added via the additional funnel over a period of 5 minutes followed by rinsing the residual BMEA in the additional funnel into the flask with Sulfolane (5 g). After holding the temperature for 30 minutes at 60° C., aqueous KOH solution (1755 g, 3% by weight) was added over a period of 10 minutes via the additional funnel followed by de-ionized water (5 g). The mixture was maintained at 60° C. for 1 hr and cooled to room temperature to provide a clear water soluble polyurethane solution.

Preparation of Pigmented Dispersions

Cyan and Yellow pigmented dispersions were prepared with TRB-2 (cyan) and Y74 (yellow) pigments using the polymeric dispersant prepared above as a dispersant.

Using an Eiger Minimill, a premix was prepared at typically 20-30% pigment loading and the targeted dispersant level was selected at a pigment/dispersant (P/D) ratio of 1.5-3.0. A P/D of 2.5 corresponds to a 40% dispersant level on pigment. Optionally, a co-solvent was added at 10% of the total dispersion formulation to facilitate pigment wetting and dissolution of dispersant in the premix stage and ease of grinding during milling stage. Although other similar co-solvents are suitable, triethylene glycol monobutyl ether (TEB as supplied from Dow Chemical) was the co-solvent of choice. The pigment dispersant was pre-neutralized with either KOH or amine to facilitate solubility and dissolution into water. During the premix stage, the pigment level was maintained at typically 27%, and was subsequently reduced to about 24% during the milling stage by the addition of de-ionized water for optimal media mill grinding conditions. After completion of the milling stage, which was typically 4 hours, the remaining letdown of de-ionized water was added and thoroughly mixed.

The pigmented dispersions processed with co-solvent were purified using an ultrafiltration process to remove co-solvent(s) and filter out other impurities that may be present. After completion, the pigment levels in the dispersions were reduced to about 10 to 15%. The cyan pigment dispersion thus obtained has a pigment/dispersant ratio of 3:1. The yellow pigment dispersion has a pigment/dispersant ratio of 6:1.

The cyan and yellow pigmented dispersions prepared above were treated with a cross-linking compound, Denacol® 321, and heated to between 60° C. and 80° C. with efficient stirring for between 6 to 8 hours. After the cross-linking reaction was completed, the pH was adjusted to at least about 8.0 if needed to provide cross-linked cyan and yellow pigment dispersions.

Amphoteric Polyurethane Binders

An anionic crosslinked polyurethane binder (Comp. PU) without tertiary amine functionality was prepared according to the procedure disclosed in U.S. Patent Application Publication No. 2005/0215663 (incorporated by reference herein for all purposes as if fully set forth) under "Polyurethane Dispersoid (PUD EX 1)". This binder was used as a comparative example.

PUD-A

To a dry, alkali- and acid-free flask, equipped with an addition funnel, a condenser, stirrer and a nitrogen gas line was added Desmophen® C1200 (392 g), MDEA (17 g), acetone (190 g) and 0.02 g DBTL. The contents were heated to 40° C. and mixed well. IPDI (147 g) was then added to the flask via the addition funnel with any residual IPDI being rinsed from the addition funnel into the flask with 10 g acetone.

The flask temperature was raised to 50° C., held for 60 minutes then followed by DMPA (28 g), then followed by TEA (16.5 g), addition to the flask via the addition funnel, which was then rinsed with acetone (10 g). The flask temperature was then raised again to 50° C. and held at 50° C. until NCO % was 1.3% or less.

With the temperature at 50° C., deionized water (962 g) was added over 10 minutes, followed by TETA solution (63 g as 10.5 wt % solution in water) over 5 minutes, via the addition funnel. The mixture was held at 50° C. for 1 hour then cooled to room temperature.

Acetone (210 g) was removed under vacuum, leaving a final dispersion of polyurethane with about 35.0% solids by weight. Acid number of PUD-A is 21. pH is 8.27 and % THF insoluble is 87%.

PUD-B

To a dry, alkali- and acid-free flask, equipped with an addition funnel, a condenser, stirrer and a nitrogen gas line was added Desmophen® C1200 (280 g), MDEA (17 g), acetone (136 g) and 0.02 g DBTL. The contents were heated to 40° C. and mixed well. IPDI (115 g) was then added to the flask via the addition funnel with any residual IPDI being rinsed from the addition funnel into the flask with 10 g acetone.

The flask temperature was raised to 50° C., held for 60 minutes then followed by DMPA (20 g), then followed by TEA (12 g), addition to the flask via the addition funnel, which was then rinsed with acetone (10 g). The flask temperature was then raised again to 50° C. and held at 50° C. until NCO % was 1.25% or less.

With the temperature at 50° C., deionized water (695 g) was added over 10 minutes, followed by TETA solution (44 g as 10.5 wt % solution in water) over 5 minutes, via the addition funnel. The mixture was held at 50° C. for 1 hour then cooled to room temperature.

Acetone (156 g) was removed under vacuum, leaving a final dispersion of polyurethane with about 35.0% solids by weight. Acid number of PUD-B is 20. pH is 8.35 and % THF insoluble is 90%.

PUD-C

To a dry, alkali- and acid-free flask, equipped with an addition funnel, a condenser, stirrer and a nitrogen gas line was added Desmophen® C1200 (280 g), MDEA (12 g), acetone (130 g) and 0.02 g DBTL. The contents were heated to 40° C. and mixed well. IPDI (105 g) was then added to the flask via the addition funnel with any residual IPDI being rinsed from the addition funnel into the flask with 10 g acetone.

The flask temperature was raised to 50° C., held for 60 minutes then followed by DMPA (20 g), then followed by TEA (3 g), addition to the flask via the addition funnel, which was then rinsed with acetone (10 g). The flask temperature was then raised again to 50° C. and held at 50° C. until NCO % was 1.25% or less.

With the temperature at 50° C., deionized water (695 g) and 28% ammonia solution (7 g) was added over 10 minutes, followed by TETA solution (26 g as 10.5 wt % solution in water) over 5 minutes, via the addition funnel. The mixture was held at 50° C. for 1 hour then cooled to room temperature.

Acetone (150 g) was removed under vacuum, leaving a final dispersion of polyurethane with about 35.0% solids by weight. Acid number of PUD-C is 21. pH is 8.71.

PUD-D

To a dry, alkali- and acid-free flask, equipped with an addition funnel, a condenser, stirrer and a nitrogen gas line was added Desmophen® C1200 (280 g), MDEA (17 g), acetone (136 g) and 0.02 g DBTL. The contents were heated to 40° C. and mixed well. IPDI (115 g) was then added to the flask via the addition funnel with any residual IPDI being rinsed from the addition funnel into the flask with 10 g acetone.

The flask temperature was raised to 50° C., held for 60 minutes then followed by DMPA (20 g), then followed by TEA (3 g), addition to the flask via the addition funnel, which was then rinsed with acetone (10 g). The flask temperature was then raised again to 50° C. and held at 50° C. until NCO % was 1.25% or less.

With the temperature at 50° C., deionized water (695 g) and 28% ammonia solution (14 g) was added over 10 minutes, followed by TETA solution (26 g as 10.5 wt % solution in water) over 5 minutes, via the addition funnel. The mixture was held at 50° C. for 1 hour then cooled to room temperature.

Acetone (156 g) was removed under vacuum, leaving a final dispersion of polyurethane with about 35.00/solids by weight. Acid number of PUD-D is 21 and pH is 8.56.

Five yellow inks (Inks Y-Y4) were prepared using the yellow pigment dispersion prepared above together with a binder as listed in Table 1 below using a typical ink-jet aqueous vehicle. The weight % of the yellow pigment in the final ink is 4%, and the weight % of the binder in the final ink is 6%.

TABLE 1

| Polyurethane Binder Properties | Ink Y (Comparative) | Ink Y1 | Ink Y2 | Ink Y3 | Ink Y4 |
|---|---|---|---|---|---|
| | Comp. PU | PUD-A | PUD-B | PUD-C | PUD-D |
| Initial Viscosity (cps) | 6.27 | 4.72 | 4.89 | 4.35 | 4.26 |
| Viscosity after aging at 70° C. for 1 week | 4.50 | 4.28 | 4.45 | 4.14 | 4.11 |
| Viscosity % drift after 1 week | −28% | −9% | −9% | −5% | −4% |
| Viscosity after aging at 70° C. for 2 weeks | 3.91 | 4.11 | 4.32 | 4.03 | NA |
| Viscosity % drift after 2 week | −38% | −11% | −12% | −7% | NA |

Five cyan inks (Inks C-C4) were prepared using the cyan pigment dispersion prepared above together with a binder as listed in Table 2 below using a typical ink-jet aqueous vehicle. The weight % of the cyan pigment in the final ink is 2.8%, and the weight % of the binder in the final ink is 6%.

TABLE 2

| Polyurethane Binder Properties | Ink C (Comparative) | Ink C1 | Ink C2 | Ink C3 | Ink C4 |
|---|---|---|---|---|---|
| | Comp. PU | PUD-A | PUD-B | PUD-C | PUD-D |
| Initial Viscosity (cps) | 6.71 | 5.50 | 5.45 | 4.70 | 3.99 |
| Viscosity after aging at 70° C. for 1 week | 4.58 | 4.52 | 4.59 | 4.13 | 3.99 |
| Viscosity % drift after 1 week | −32% | −18% | −16% | −12% | −0% |
| Viscosity after aging at 70° C. for 2 weeks | 4.86 | 4.94 | 4.56 | NA | NA |
| Viscosity % drift after 2 week | −28% | −10% | −16% | NA | NA |

What is claimed is:

1. An ink-jet ink comprising an aqueous vehicle, a colorant, and a self-stabilized amphoteric polyurethane as a binder, wherein said amphoteric polyurethane contains a plurality of tertiary amine groups derived from an amine-containing monomer, and a plurality of anionic acid groups, said colorant is selected from the group consisting of a self-dispersing pigment, a pigment dispersed by a polymeric dispersant, a dispersed dye, and a dye, and wherein said amphoteric polyurethane is not a dispersant.

2. The ink of claim 1, wherein said colorant is a pigment dispersed by a polymeric dispersant.

3. The ink of claim 2, wherein said ink is neutralized by alkaline to having a pH of greater than about 7.

4. The ink of claim 3, wherein said ink has a viscosity drift of less than 20% after oven aging at 70° C. for 14 days.

5. The ink of claim 4, wherein said anionic acid groups are carboxylic groups with an acid number in the range of 10 through 90.

6. The ink of claim 5, wherein said binder is crosslinked.

7. The ink of claim 6, wherein the % THF insoluble of said crosslinked binder is equal or greater than 30%.

8. The ink of claim 1, wherein said colorant is a self-dispersing pigment.

9. The ink of claim 8, wherein said ink is neutralized by alkaline to having a pH of greater than about 7.

10. The ink of claim 9, wherein said ink has a viscosity drift of less than 20% after oven aging at 70° C. for 14 days.

11. The ink of claim 10, wherein said anionic acid groups are carboxylic groups with an acid number in the range of 10 through 90.

12. The ink of claim 11, wherein said binder is crosslinked.

13. The ink of claim 12, wherein the % THF insoluble of said crosslinked binder is equal or greater than 30%.

* * * * *